(12) United States Patent
Chen et al.

(10) Patent No.: US 7,466,509 B1
(45) Date of Patent: Dec. 16, 2008

(54) DISK DRIVE OPERABLE WITH FIRST AND SECOND SERVO PATTERNS IN A PERPENDICULAR MEDIA RECORDING ENVIRONMENT

(75) Inventors: Teddy T. C. Chen, Huntington Beach, CA (US); Jinsheng Bill Jang, Irvine, CA (US); Jie Yu, Irvine, CA (US); Jonathan V Nguyen, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 294 days.

(21) Appl. No.: 11/525,406

(22) Filed: Sep. 22, 2006

(51) Int. Cl.
   *G11B 21/02* (2006.01)
(52) U.S. Cl. ...................................... 360/75
(58) Field of Classification Search .................. 360/75, 360/46, 51, 77.04, 77.08, 31, 48
   See application file for complete search history.

(56) References Cited

U.S. PATENT DOCUMENTS

| | | | |
|---|---|---|---|
| 5,734,638 A | 3/1998 | Matsui | |
| 5,835,312 A | 11/1998 | Kuroe et al. | |
| 6,185,059 B1 * | 2/2001 | Buch et al. | 360/51 |
| 6,310,740 B1 * | 10/2001 | Dunbar et al. | 360/46 |
| 6,320,719 B1 | 11/2001 | Albrecht et al. | |
| 6,462,904 B1 | 10/2002 | Albrecht et al. | |
| 6,493,173 B1 * | 12/2002 | Kim et al. | 360/77.04 |
| 6,525,892 B1 * | 2/2003 | Dunbar et al. | 360/31 |
| 6,560,168 B1 | 5/2003 | Saga et al. | |
| 6,747,822 B2 | 6/2004 | Saito | |
| 6,917,493 B2 | 7/2005 | Clinton et al. | |
| 7,123,434 B2 * | 10/2006 | Roth | 360/77.08 |
| 7,372,650 B1 * | 5/2008 | Kupferman | 360/48 |
| 7,388,728 B1 | 6/2008 | Chen et al. | |
| 2003/0197968 A1 | 10/2003 | Sacks et al. | |
| 2005/0105213 A1 | 5/2005 | Takeo et al. | |
| 2006/0028750 A1 | 2/2006 | Sakurai et al. | |
| 2007/0025010 A1 * | 2/2007 | Miles | 360/75 |

OTHER PUBLICATIONS

Office Action dated Sep. 21, 2007 from U.S. Appl. No. 11/525,411, 6 pages.
Notice of Allowance dated Feb. 20, 2008 from U.S. Appl. No. 11/525,411 (A 1691), 6 pages.

* cited by examiner

*Primary Examiner*—Fred Tzeng
(74) *Attorney, Agent, or Firm*—Blakely, Sokoloff, Taylor & Zafman

(57) ABSTRACT

A disk drive operable with first and second servo patterns in a perpendicular media recording (PMR) environment is disclosed. The disk drive comprises a head operable with a perpendicular flux, a disk, and a servo controller. The disk includes a plurality of tracks, wherein each track has a plurality of servo sectors utilized in seek operations. The servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively. The servo controller operates in a first mode when seeking within one of the first or second servo patterns and a second mode when seeking between the first servo pattern and the second servo pattern.

27 Claims, 7 Drawing Sheets

DISK DRIVE OPERABLE WITH FIRST AND SECOND SERVO PATTERNS IN A PERPENDICULAR MEDIA RECORDING ENVIRONMENT

CROSS-REFERENCE TO RELATED APPLICATIONS

This application is related to and hereby cross-referenced with an application Ser. No. 11/525,411 entitled "System and Method for Writing Servo Sectors in a Perpendicular Media Recording Environment", filed on the same day by inventors Chen et al., the disclosure of said application being hereby incorporated by reference, both applications to be assigned to Western Digital Corporation.

BACKGROUND OF THE INVENTION

1. Field of the Invention

The present invention relates a disk drive operable with first and second servo patterns in a perpendicular media recording environment.

2. Description of the Prior Art and Related Information

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes a phase lock loop (PLL) field, a servo synch mark (SSM) field, a gray-coded track identification (TKID), a sector ID field having a binary encoded sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a course "seek" mode using the gray-coded TKID field as a control input.

When manufacturing a disk drive, servo sectors are typically written to the disk in order to define a plurality of evenly-spaced, concentric tracks. As previously discussed, a typical servo wedge includes a PLL field, a SSM field, a gray-coded TKID field, and a wedge ID field.

Servo writers are typically used to write the servo sectors to the disk surface during manufacturing. Servo writers may employ extremely accurate head positioning mechanics, such as laser interferometers or optical encoders, to ensure that the servo sectors are written at the proper radial location, typically, from the inner diameter of the disk to the outer diameter of the disk. In addition, extremely accurate clocking systems may be utilized in order to write the servo sectors in the proper circumferential locations on the disk. Servo-writing may occur both in-situ utilizing the disk drive itself or just the HDA of the disk drive to write the servo-sectors, or servo-writing may be performed on a disk in an external environment.

As previously discussed, the disk drive industry is very competitive and disk drives are continually being sought after by consumers that provide substantial capacity and rapid access to data. In order to meet consumer demand for increased capacity and faster access to data, a new form of media recording, entitled perpendicular media recording (PMR) is now being utilized in order to increase the amount of data that can be stored on a disk.

Perpendicular media recording (PMR) allows hard disk drive manufacturers to put more bits of data on each square inch of disk because of magnetic geometry. In perpendicular media recording, writing on the magnetic media occurs in a fashion in which the bits are aligned vertically, perpendicular to the disk, rather than parallel to the media as is currently done. By writing bits of data in a vertical fashion, higher recording densities on the disk are enabled because bits of data can be packed closer together.

Further, by utilizing perpendicular media recording (PMR) an improvement results in that bits are better able to retain their magnetic charges, a property called coercivity. This helps to alleviate the "flipped bit" problem associated with standard parallel recording techniques. Due to the ever increasing bit density provided on disk media utilizing standard parallel recording techniques, bits are being written closer and closer together to improve disk density, such that when random thermal vibrations occur bits may be "flipped"—in which the magnetic north and south poles of bits are suddenly and spontaneously reversed, resulting in corrupted data.

Although perpendicular media recording (PMR) offers vast advantages in the amount and reliability of data that can be stored on a disk of a disk drive, there is presently a problem in servo writing disks utilizing PMR technology due to the PMR disk head's footprint and sensitivity to skew angle in writing servo sectors to a disk.

For example, in utilizing conventional servo writing techniques with a PMR head, servo writing typically occurs in a single direction. Unfortunately, a problem occurs in that the written-in servo sector may become unreadable at large skew angles due to the footprint of the PMR head. For example, when servo-writing in a single direction from the inner diameter (ID) of the disk to the outer diameter (OD) of the disk, as is commonly done, servo sectors may become unreadable at the OD side of the disk.

More particularly, when servo-writing in a single direction utilizing a PMR head, at large skew angles, written-in servo sectors and the gray coded TKIDs contained therein used for seek operations may become unreadable resulting in wasted disk space and potential problems for disk drive operations.

SUMMARY OF THE INVENTION

The present invention relates to a disk drive operable with first and second servo patterns in a perpendicular media recording (PMR) environment.

In one embodiment of the present invention, a disk drive operable with first and second servo patterns in a perpendicular media recording (PMR) environment is disclosed. The disk drive comprises a moveable head operable with a perpendicular flux, a disk, and a servo controller. The disk includes a plurality of tracks, wherein each track has a plurality of servo sectors utilized in seek operations. The servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively. The servo controller controls seek operations with the moveable head. The servo controller operates in a first mode when seeking within one of the first or second servo patterns and a second mode when seeking between the first servo pattern and the second servo pattern.

In another embodiment of the present invention, a method for performing seek operations in a disk drive is disclosed. The method comprises moving a head operable with a perpendicular flux relative to a disk. The disk includes a plurality of tracks and each track includes a plurality of servo sectors utilized in seek operations, wherein the servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively. The method further comprises controlling the movement of the head in both a first mode and a second mode to perform seek operations, wherein, in the first mode, the movement of the head for a seek operation is within one of the first or second servo patterns and, wherein, in the second mode, movement of the head for a seek operation is between the first servo pattern and the second servo pattern.

In yet another embodiment of the present invention, a disk drive is disclosed, in which the disk drive includes a head and processor-readable medium having stored thereon instructions which when executed by a processor of the disk drive, causes the disk drive to perform a plurality of operations. Particularly, the processor-readable medium instructions, when executed by the processor of the disk drive, causes the disk drive to perform operations comprising: moving a head operable with a perpendicular flux relative to a disk, in which the disk includes a plurality of tracks and each track includes a plurality of servo sectors utilized in seek operations, wherein the servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively; and controlling the movement of the head in both a first mode and a second mode to perform seek operations, wherein, in the first mode, the movement of the head for a seek operation is within one of the first or second servo patterns and, wherein, in the second mode, movement of the head for a seek operation is between the first servo pattern and the second servo pattern.

The foregoing and other features are described in detail in the Detailed Description and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understandings of this description.

Figure 1:
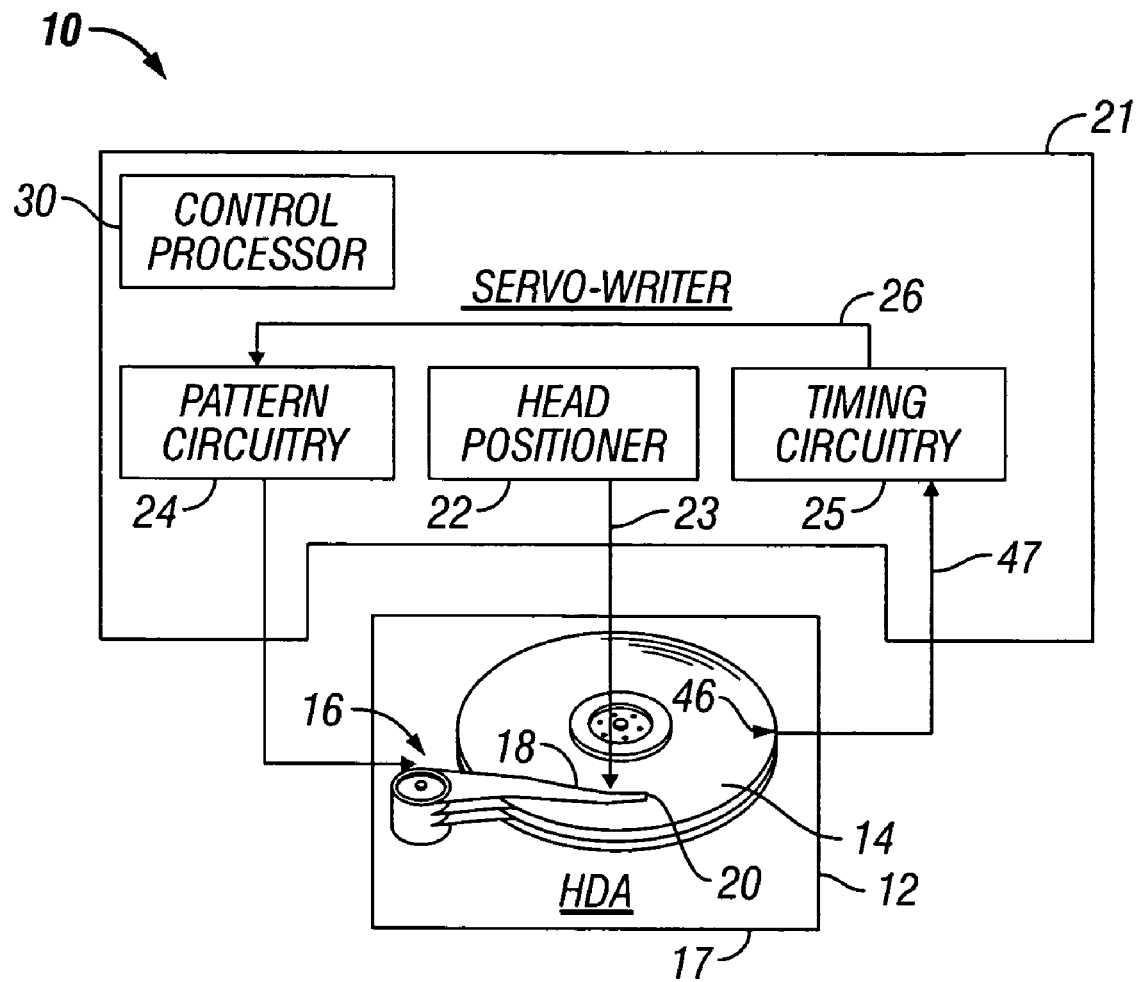
FIG. 1 is block diagram illustrating an example of a servo track writer (STW), in which embodiments of the invention related to a system and method for writing servo sectors in a perpendicular media recording (PMR) environment to a disk may be employed.

With reference to FIG. 1, FIG. 1 is block diagram illustrating an example of a servo track writer (STW), in which embodiments of the invention related to a system and method for writing servo sectors in a perpendicular media recording (PMR) environment to a disk, may be employed.

As shown in FIG. 1, a servo track writer (STW) 21 may operate in an in-situ environment 10, in which the STW 21 may be employed to write servo sectors and other servo information to one or more disks 14 of an HDA 17 of a disk drive 12. Alternatively, in some embodiments, the STW may operate only upon an HDA. It should be appreciated that this is a very simplified illustration of an HDA, and many components are not shown and are not discussed, in order not obscure the embodiments of the invention. Further, hereinafter servo-writing will be discussed with reference to disk 14, however, it will be appreciated by those of skill in this art that one more disks 14 may be simultaneously or serially written to.

Disk drive 12 may comprise a head disk assembly (HDA) 17 that includes a disk 14, an actuator arm 18, a perpendicular magnetic recording (PMR) head 20 coupled to a distal end of the actuator arm 18, and a voice coil motor (VCM) 16 for rotating the actuator arm 18 about a pivot to position PMR head 20 radially over disk 14. As will be described, PMR head 20 writes servo sectors onto the disk 14 with a perpendicular flux such that STW is a PMR STW.

The PMR STW 21 may employ a write clock that is synchronized to the rotation of the disk 14 such that a plurality of servo sectors may be written onto the disk 14 at pre-determined radial locations, as will be described. In this embodiment, PMR STW 21 comprises a head positioner 22 for actuating a head positioning pin 23 using sensitive position measurement circuitry, such as a laser interferometer or an optical encoder. Pattern circuitry 24 generates a data sequence written to the disk 14 for the servo sectors.

An optical or magnetic clock head 46 reads an optical or magnetic clock track to generate a clock signal 47 processed by timing circuitry 25 to synchronize a write clock signal 26 so that servo sectors are written at appropriate radial positions on the disk 14. This optical or magnetic clock track may be formed at the outside radius of at least one disk, or it may also be formed at the inside radius of at least one disk, or it may be formed or written on some other rotating member of the disk drive such as the spindle motor, hub or disk attachment clamp.

PMR STW 21 under the control of control processor 30 controls the HDA 17 such that actuator arm 18 is rotated to position the PMR head 20 radially over disk 14 in order to write servo sectors onto disk 14 based upon the output clock signal 26 that has been processed by timing circuitry 25. In this way, a pre-determined sequence of servo-sectors may be servo-written to a disk 14.

It should be appreciated that the PMR STW 21 may be utilized with a complete disk drive or just an HDA of a disk drive. It should further be appreciated that many other types of servo track writers (STWs) may be utilized with embodiments of the invention for a system and method for writing servo sectors in a perpendicular media recording (PMR) environment. For example, in another embodiment, an external PMR STW may be utilized in an external media writing environment such as a clean room. For example, in an external media writing environment, multiple disks may be servo written without having to be located in the HDA of a disk drive or within a disk drive itself.

In one embodiment, under the control of control processor 30 and based upon write clock signal 26 and the other components of PMR STW 21, head positioner 22 positions PMR head 20 relative to disk 14 such that PMR head 20 writes servo sectors onto the disk 14 from one of an inner diameter (ID) or an outer diameter (OD) of disk 14 to a middle diameter (MD) of disk 14, respectively, followed by writing servo sectors between the other of the OD or the ID of disk 14 to the MD of disk 14, respectively.

Figure 2:
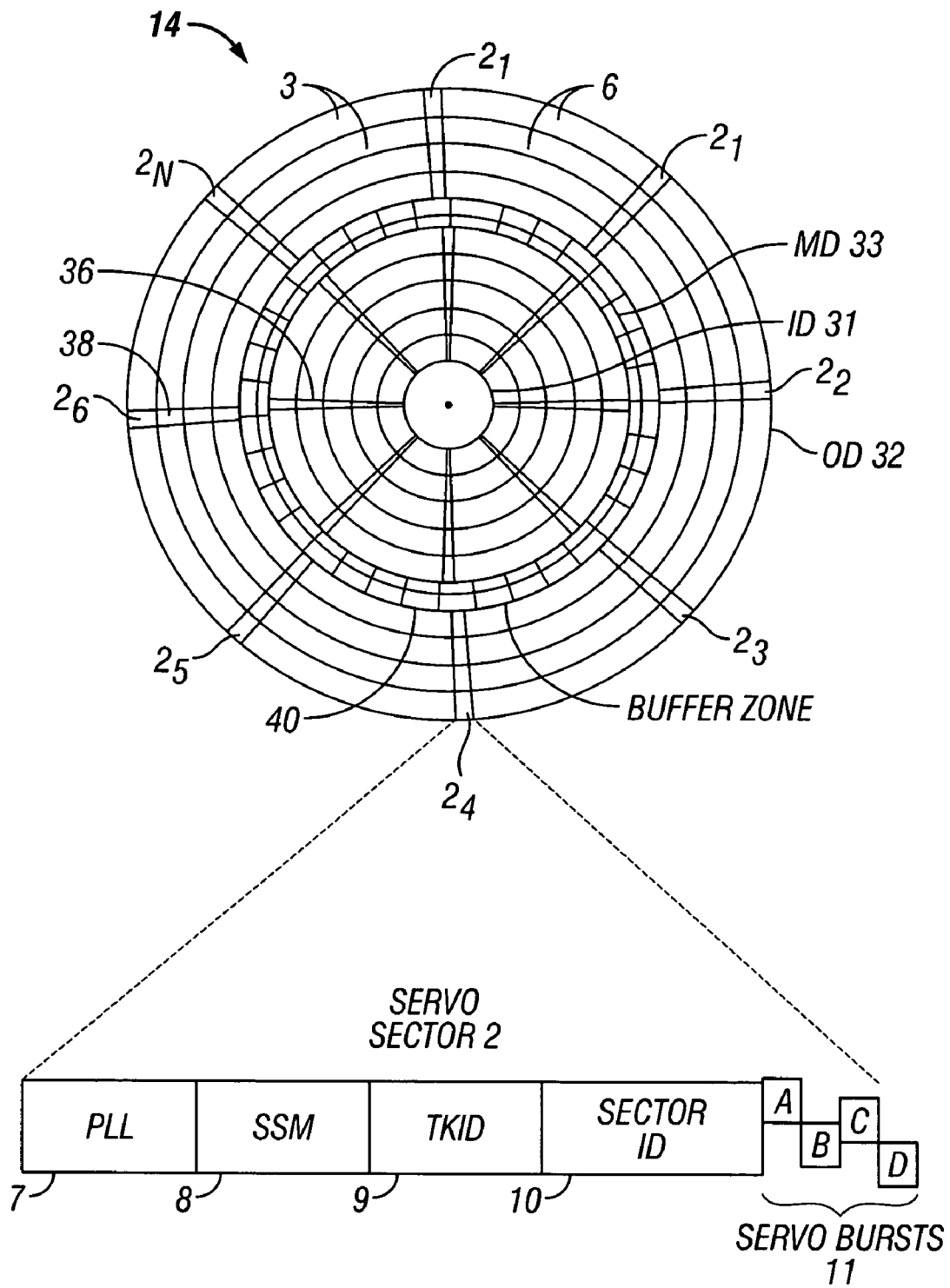
FIG. 2 is a diagram of a disk that illustrates servo sectors written onto a disk in a PMR environment, according to one embodiment of the present invention.

With reference also to FIG. 2, a diagram of a disk 14 is shown that illustrates servo sectors $2_{0\text{-}N}$ written onto disk 14 in a PMR environment according to embodiments of the invention. As is known, when manufacturing a disk drive, servo sectors $2_0$-$2_N$ are written to disk 14 in order to define a plurality of evenly-spaced, concentric tracks 6.

Each servo sector 2 may include a phase lock loop (PLL) field 7, a servo synch mark (SSM) field 8, a track identification (TKID) field 9, a sector ID 10, and a group of servo bursts (e.g. ABCD) 11, (e.g. an alternating pattern of magnetic transitions), that the servo control system of the disk drive samples to align the moveable transducer head with, and relative to, a particular track 6.

Each circumferential track 6 includes a plurality of embedded servo sectors $2_{0\text{-}N}$ utilized in seeking and track following. The plurality of servo sectors $2_{0\text{-}N}$ are spaced sequentially around the circumference of a circumferential track 6 and extend radially outward from the inner diameter (ID) 31 of the disk 14. These embedded servo sectors 2 contain servo information utilized in seeking and track following and are interspersed between data regions 3 of the disk 14. Data is conventionally written in the data regions 3 in a plurality of discrete data sectors. Each data region 3 is typically preceded by a servo sector 2.

The PMR STW 21 under the control of controller 30 utilizes head positioner 22 to position the PMR head 20 relative to disk 14 and controls head positioner 22 such that PMR head 20 writes servo sectors $2_{0\text{-}N}$ onto disk 14 from one of inner diameter (ID) 31 or outer diameter (OD) 32 of the disk 14 to middle diameter (MD) 33 of disk 14, respectively, followed by writing servo sectors $2_{0\text{-}N}$ between the other of the OD or the ID of the disk to the MD of the disk, respectively.

As an example, in this embodiment, a first servo pattern 36 is created between the ID 31 and the MD 33 of the disk and a second servo pattern 38 is created between the OD 32 and the MD 33 of disk 14. The first servo pattern 36 includes a first plurality of gray-coded servo patterns aligned with a starting point from the ID 31 and the second servo pattern 38 includes a second plurality of gray-coded servo patterns aligned with a starting point from the OD 32 such that the first and second plurality of gray-coded servo patterns 36 and 38 are offset from one another as shown in FIG. 2.

It should be appreciated that the PMR STW 21 can either write servo sectors $2_{0\text{-}N}$ from the ID 31 to the MD 33 and then from the OD 32 to the MD 33 or from the OD 32 to the MD 33 and then from the ID 31 to the MD 33. For ease of reference, it will be assumed that the PMR STW 21 writes the servo sectors $2_{0\text{-}N}$ from the ID 31 to the MD 33 followed by the OD 32 to the MD 33. However, it should be appreciated that either method is suitable.

Particularly, utilizing this methodology, a buffer zone 40 is created between the first servo pattern 36 and the second servo pattern 38. The buffer zone 40 includes an area that has been written to with both the first servo pattern 36 and the second servo pattern 38. The buffer zone 40 is particularly illustrated in FIG. 2.

The location of the buffer zone 40 may be stored in the disk drive 12 associated with the disk 14 that has been servo-written to in this manner. In some embodiments, the buffer zone 40 may be less than approximately three-hundred tracks wide.

Also, although not particularly described, it should be appreciated that the PMR head 20 may be of many different shapes and geometries as PMR technology is continually evolving. In one embodiment, the PMR head 20 may be approximately trapezoidally-shaped.

It should also further be appreciated that, in one embodiment, the PMR STW 21 may include a processor-readable medium having stored thereon instructions which when executed by the control processor 30 of the PMR STW 21, causes the PMR STW 21 to perform a plurality of operations. Particularly, the processor-readable medium instructions, when executed by the control processor 30 of the PMR STW 21, may cause the PMR STW 21 to perform operations comprising: moving the head positioner 22 to position the PMR head 20 of the HDA 17 relative to the disk 14; commanding the PMR head 20 to write servo sectors $2_{0\text{-}N}$ onto the disk 14, wherein PMR head 20 writes servo sectors $2_{0\text{-}N}$ onto disk 14 with a perpendicular flux; and controlling the movement of PMR head 20 with the head positioner 22 such that PMR head 20 write servo sectors $2_{0\text{-}N}$ onto disk 14 from one of the ID 31 or the OD 32 of the disk to the MD 33 of the disk, respectively, followed by writing servo sectors $2_{0-N}$ between the other of the OD 32 or the ID 31 of the disk to the MD 33 of disk 14, respectively.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

Figure 3:
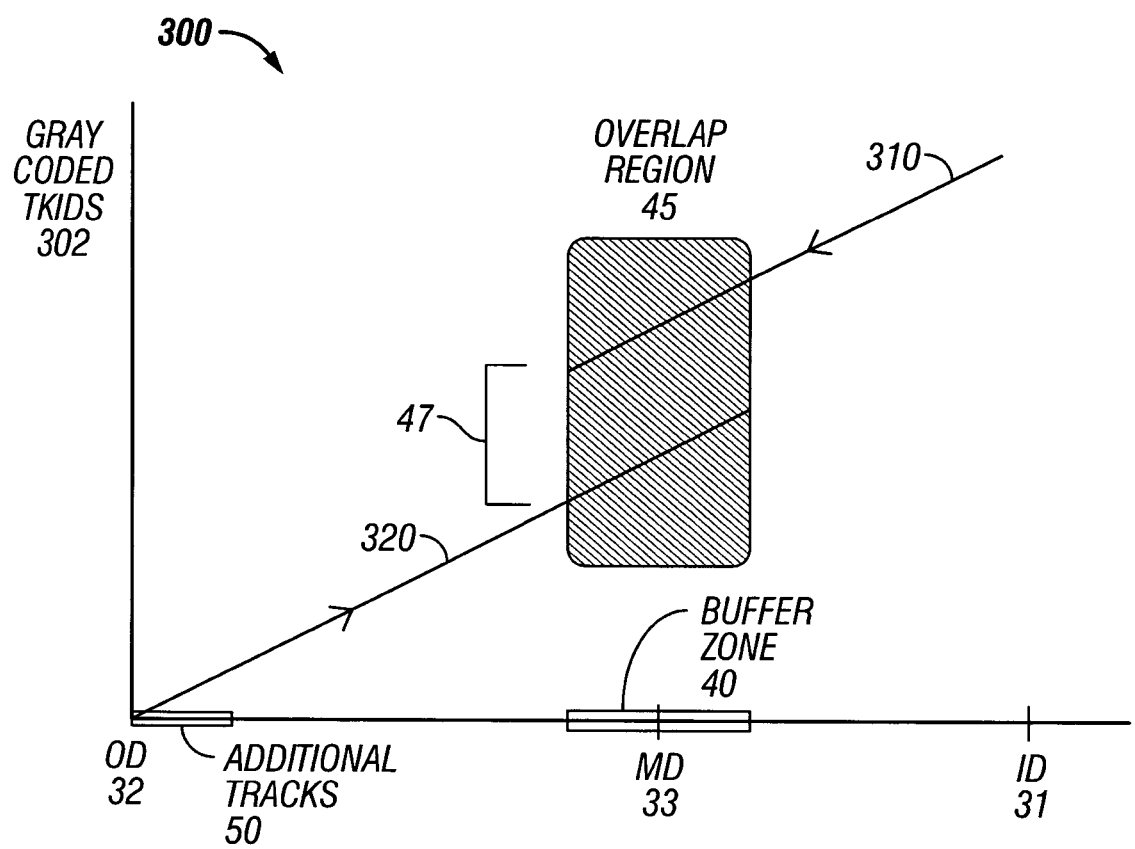
FIG. 3 is a graph illustrating physical gray coded TKID values of servo sectors (Y-axis) versus tracks (X-axis) and also illustrates the stroke direction of the servo-writing, according to one embodiment of the present invention.

Turning now to FIG. 3, FIG. 3 is a graph 300 illustrating physical gray coded TKID values of the servo sectors (Y-axis) 302 versus the tracks from the OD to the ID of the disk (X-axis) and also illustrates the stroke direction of the servo-writing. In this example, as shown in FIG. 3, the first stroke 310 is from the ID 31 to the MD 33 and the second stroke 320 is from the OD 32 to the MD 33.

More particularly, as previously discussed, the PMR STW utilizing the head positioner moves the PMR head of the HDA relative to the disk from the ID 31 of the disk 14 to the MD 33 of the disk through the buffer zone 40 as represented by stroke line 310. Next, as represented by stroke line 320, the PMR STW utilizing the head positioner moves the PMR head of the HDA relative to the disk from the OD 32 of the disk to the MD 33 of the disk through the buffer zone 40.

Thus, a first servo pattern is created between the ID 31 and MD 33 of the disk and a second servo pattern is created between the OD 32 and the MD 33 of the disk. Further, as shown in FIG. 3, a buffer zone 40 is created between the first servo pattern and the second servo pattern proximate the MD 33 of the disk 14. The buffer zone 40 includes an overlap region 45 that has been written to with both the first servo pattern and the second servo pattern. As further shown in FIG. 3, there is a discontinuity 47 associated with the buffer zone 40 and the overlap region 45 between the gray coded TKID values 302.

Furthermore, as shown in FIG. 3, additional tracks 50 may be servo-written near the OD 32. This is because the servo-writing, as part of a second stroke 320, begins at the OD 32 and the footprint of the PMR head and its sensitivity to skew angle is not as problematic such that additional readable servo sectors near the OD 32 may be written.

As can be seen in FIG. 3, a first servo pattern written by stroke 310 with a starting point from the ID 31 and an ending point at a the end of the buffer zone 40 includes a first plurality of gray-coded TKID servo patterns 302 that are aligned with the starting point of the ID 31. Further, a second servo pattern written by stroke 320 with a starting point from the OD 32 and an ending point at the other end of the buffer zone 40 includes a second plurality of gray-coded TKID servo patterns 302 that are aligned with the starting point of the OD 32. It should be appreciated that these gray-coded TKID servo patterns are off-set from one another. Further, there is a discontinuity 47 between these gray-coded TKID servo patterns, which occurs due to the buffer zone 40.

Figure 4:
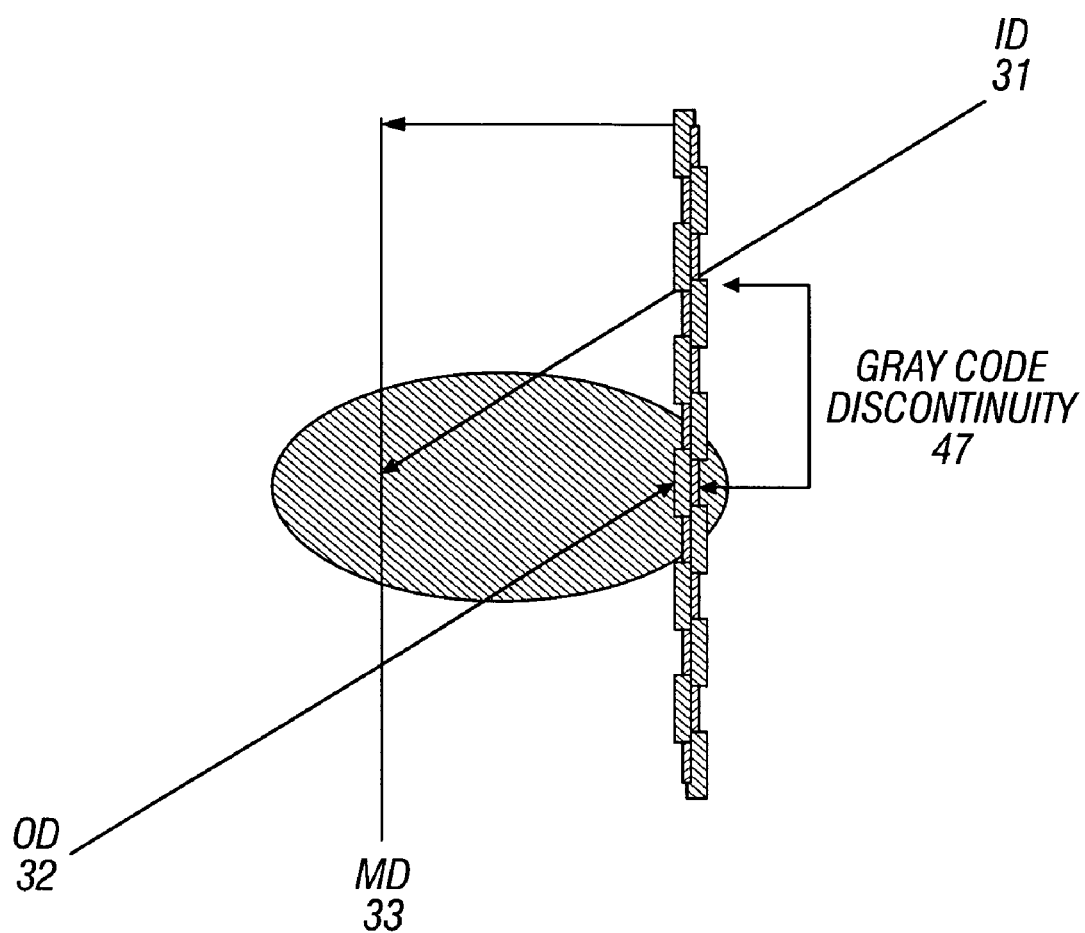
FIG. 4 is a diagram illustrating an example of a gray-coded TKID servo pattern discontinuity that occurs due to the buffer zone, according to one embodiment of the present invention.

Turning briefly now to FIG. 4, FIG. 4 is a diagram illustrating an example of this gray-coded TKID servo pattern discontinuity 47 that occurs due to the buffer zone. As shown in FIG. 4, there is a gray-coded TKID servo pattern discontinuity 47 between the first gray-coded TKID servo pattern extending between the ID 31 and the approximate MD 33 and the second gray-coded TKID servo pattern extending between the between the OD 32 and the approximate MD 33 of the disk.

A system and method for a disk drive to take into account this buffer zone and gray code discontinuity will be hereinafter discussed.

It should be appreciated that by writing the servo sectors in a first direction from the ID to the MD of the disk and in a second direction from the OD to the MD of the disk that the servo sectors and particularly the gray-coded TKIDs associated therewith are written in a consistent and readable fashion. In this way, problems related to written-in servo sectors that are unreadable due to the footprint of the PMR head and the large skew angles at which they are written, in single direction servo-writing, are overcome by this dual direction servo-writing approach. Further, by this method, in this example, even though unusable servo sectors in the buffer zone are introduced, many or all of these unusable servo sectors may be replaced by the previously-described additional tracks that may be utilized at the OD, which in traditional single direction servo-writing cannot be servo-written to, due to the footprint of a typical PMR head and the large skew at the OD.

A disk drive that may operate with the previously-described formatted disk having a first servo pattern and a second servo pattern, along with a buffer zone therebetween, will now be described.

Figure 5:
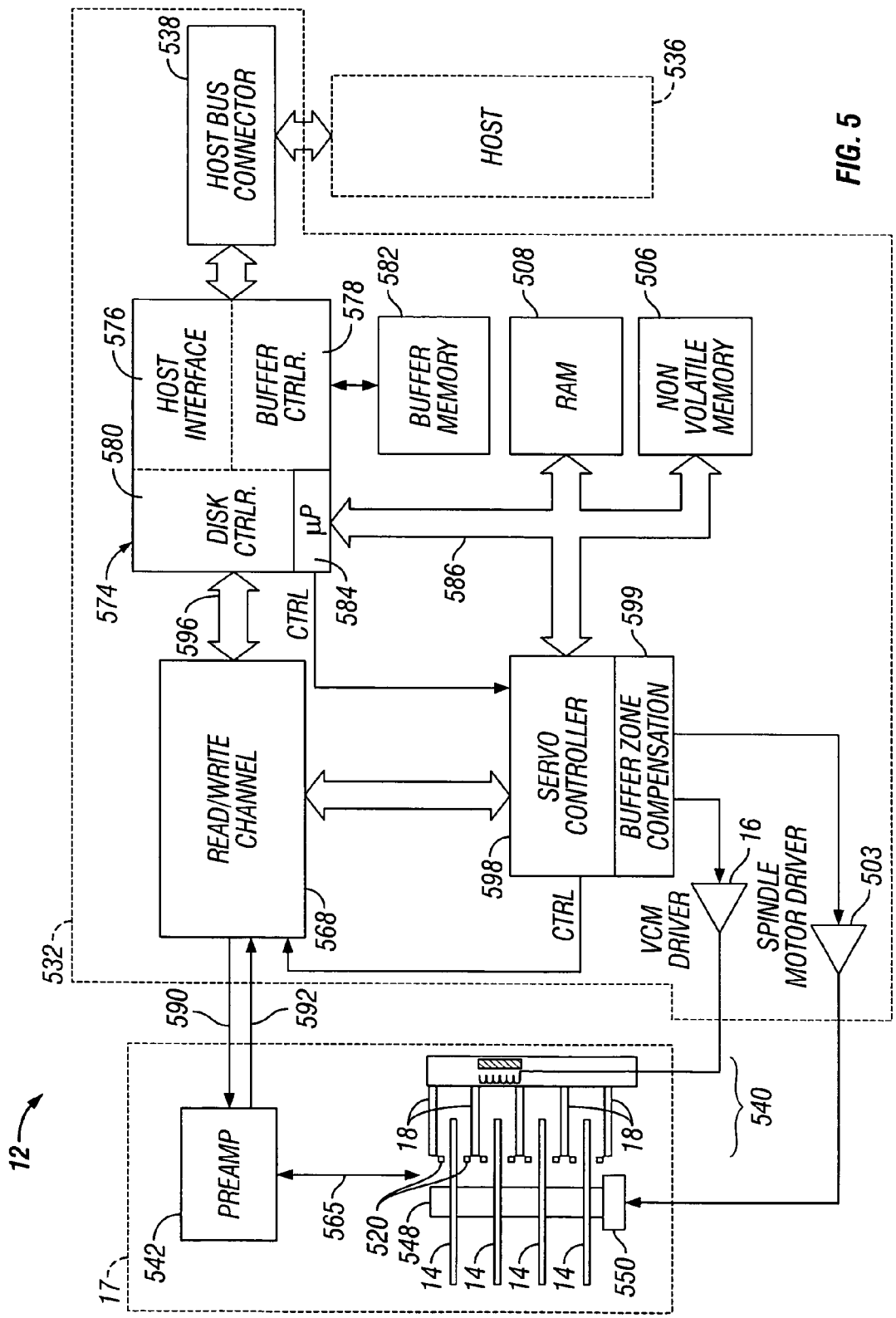
FIG. 5 shows a simplified block diagram of a disk drive, in which embodiments of the invention may be practiced.

FIG. 5 shows a simplified block diagram of disk drive 12, in which embodiments of the invention may be practiced. Disk drive 12 comprises a Head/Disk Assembly (HDA) 17 and a controller printed circuit board assembly (PCBA) 532. Host 536 may be a computing device 536 such as a desktop computer, a laptop computer, a mobile computing device (e.g. PDA, camera, cell-phone, etc.), or any type of computing device. Disk drive 12 may be of a suitable form factor and capacity for larger computers or for smaller mobile devices (e.g. a small form factor (SFF) disk drive).

The HDA 17 comprises: one or more disks 14 for data storage; a spindle motor 550 for rapidly spinning each disk 14 (four shown) on a spindle 548; and an actuator assembly 540 for moving a plurality of PMR heads 20 in unison over each disk 14. As previously described, the head(s) of disk drive 12 may be PMR heads and may operate with perpendicular flux. Further, as previously described, the one or more disk(s) 14 may be formatted and servo-written, as previously discussed, with a PMR servo-writer such that they include a first servo pattern and a second servo pattern, along with a buffer zone therebetween.

Actuator assembly 540 includes a plurality of actuator arms 18 having PMR heads 20 attached to distal ends thereof, respectively, such that the actuator arms 18 and PMR heads 20 are rotated about a pivot point so that the PMR heads sweep radially across the disks 14, respectively. The PMR heads 20 are connected to a preamplifier 542 via a cable assembly 565 for reading and writing data on disks 14. Preamplifier 542 is connected to channel circuitry in controller PCBA 532 via read data line 592 and write data line 590.

Controller PCBA 532 comprises a read/write channel 568, servo controller 598, host interface and disk controller (HIDC) 574, voice coil motor driver (VCM) 16, spindle motor driver (SMD) 503, microprocessor 584, and several memory arrays—buffer or cache memory 582, RAM 508, and non-volatile memory 506.

Servo controller 598 may operate under the control of a program or routine, including a buffer zone compensation program 599, to execute methods or processes in accordance with embodiments of the invention. These embodiments relate to accounting for the previously-described buffer zone and compensating for the buffer zone in servo operations, such as seek operations. Further, microprocessor 584 may pre-program servo controller 598 and/or initialize the servo controller with initial and operational values for use in implementing the buffer zone compensation program.

Host initiated operations for reading and writing data in disk drive 12 are executed under control of microprocessor 584 connected to the controllers and memory arrays via a bus 586. Program code executed by microprocessor 584 is stored in non-volatile memory 506 and random access memory RAM 508. Program overlay code stored on reserved tracks of disks 546 may also be loaded into RAM 508 as required for execution.

During disk read and write operations, data transferred by preamplifier 542 is encoded and decoded by read/write channel 568. During read operations, channel 568 decodes data into digital bits transferred on an NRZ bus 596 to HIDC 574. During write operations, HIDC provides digital data over the NRZ bus to channel 568 which encodes the data prior to its transmittal to preamplifier 542. Preferably, channel 568 employs PRML (partial response maximum likelihood) coding techniques, although the invention may be practiced with equal advantage using other coding processes.

HIDC 574 comprises a disk controller 580 for formatting and providing error detection and correction of disk data, a host interface controller 576 for responding to commands from host 536, and a buffer controller 578 for storing data which is transferred between disks 546 and host 536. Collectively the controllers in HIDC 574 provide automated functions which assist microprocessor 584 in controlling disk drive operations.

The servo controller 598 provides an interface between microprocessor 584 and actuator assembly 540 and spindle motor 550. Microprocessor 584 commands logic in servo controller 598 to position actuator assembly 540 using a VCM driver 502 and to precisely control the rotation of spindle motor 550 with a spindle motor driver 503.

Disk drive 12 may employ a sampled servo system in which equally spaced servo sectors are recorded on each track of each disk 14. Data sectors are recorded in the intervals between servo sectors on each track. Servo sectors are sampled at regular intervals by servo controller 598 to provide servo position information to microprocessor 584. Servo sectors are received by channel 568, and are processed by servo controller 598 to provide position information to microprocessor 584 via bus 586. Further, servo controller 598 may operate under the control of a program or routine, such as a buffer zone compensation program 599 to execute methods or processes in accordance with embodiments of the invention related to compensating for the previously-described buffer zone during servo operations such as seek operations.

As previously described with respect to FIG. 2, disk 14 includes a plurality of concentric circumferential tracks 6. Each circumferential track 6 includes a plurality of embedded servo sectors $2_{0-N}$ utilized in seeking and track following. The plurality of servo sectors 2 are spaced sequentially around the circumference of each circumferential track 6. Each servo sector 6 contains servo information utilized in seeking and track following and are interspersed between data regions 3 of the disk 14. Data is conventionally written in the data regions 3 in a plurality of discrete data sectors. Each data region 3 is typically preceded by a servo sector 2.

Also, as previously described, each servo sector 2 includes a phase lock loop (PLL) field 7, a servo synch mark (SSM) field 8, a track identification (TKID) field 9, a sector identifier (ID) 10, and a group of servo bursts (e.g. ABCD) 11 (e.g. an alternating pattern of magnetic transitions), that the servo control system samples to align the moveable PMR head 20 with, and relative to, a particular track. Typically, servo controller 598 moves the PMR head 20 toward the desired track during a course "seek" mode using the TKID field 9 as a control input.

In processing information, it may be necessary to ensure consistency in the detection of bits composing a block of bits. In order to ensure such consistency, the phase lock loop (PLL) field 7 is first read in order to facilitate bit synchronization. Next, the SSM field 8 is read to facilitate block synchronization. The SSM field 8 facilitates a block synchronization by acting as a special marker that is detected to "frame" data (i.e., to identify a boundary of a block). A valid servo synchronization signal results in the read/write channel 568 of the disk drive 12 establishing a precise timing reference point for the reading of servo data and for read/write operations. It is well known to provide framing of servo data via a SSM 8. The sector ID 10 may be a binary encoded sector ID number to identify the sector of the track.

Further, once the PMR head 20 is generally over the desired track 6, the servo controller 598 uses the servo bursts (e.g. ABCD) 11 to keep the transducer head over the track in a fine "track follow" mode. During track following mode, the moveable PMR head 20 repeatedly reads the sector ID 10 of each successive servo sector to obtain the binary encoded sector ID number that identifies each sector of the track.

Based on the TKID 9 and sector ID 10, the servo controller 598 continuously knows where the PMR head 20 is relative to the disk 14 and communicates this to microprocessor 584. In this way, the microprocessor 584 continuously knows where the PMR head 20 is relative to the disk and can command the movement of PMR head 20, via the servo control system, to implement disk drive operations, such as seeking, tracking, read/write operations, etc.

It should be noted that, as previously described with reference to FIG. 2, that the servo sectors 2 that are servo written with PMR head 20 onto disk 14, are, in one example, written first between the ID 31 of the disk 14 to the MD 33 of the disk 14 to create a first servo pattern 36 and are then written between the OD 32 and the MD 33 of the disk 14 to create a second servo pattern 38. The first servo pattern 36 includes a first plurality of gray-coded servo patterns aligned with a starting point from the ID 31 and the second servo pattern 38 includes a second plurality of gray-coded servo patterns aligned with a starting point from the OD 32 such that the first and second plurality of gray-coded servo patterns are offset from one another. Moreover, each of the first and second plurality of gray-coded servo patterns each includes gray-coded TKID fields associated with each respective servo sector.

Further, as previously discussed, a buffer zone 40 is created between the first servo pattern 36 and the second servo pattern 38 wherein the buffer zone 40 includes an area that has been written to with both the first servo pattern 36 and the second servo pattern 38. Generally, the buffer zone 40 is present between the first servo pattern 36 and the second servo pattern 38 proximate the MD 33 of the disk.

Characteristics associated with the buffer zone 40 may be stored in non-volatile memory 506 (e.g. Flash memory) of disk drive 12 and provided to the servo controller 598 and/or RAM 508 upon power up of disk drive 12. Further, servo controller 598 may store the buffer zone characteristics for use in servo operations, such as seek operations, as will be discussed in more detail hereinafter. Buffer zone characteristics may include a buffer zone size, a buffer zone starting track identifier (TKID) and a buffer zone ending track identifier (TKID).

Servo controller 598 may operate under the control of a program or routine, such as a buffer zone compensation program 599 to execute methods or processes in accordance with embodiments of the invention. Embodiments of the invention relate to implementing a buffer zone compensation method in order to account for the buffer zone 40 in seeking between the first and second sets of servo patterns 36 and 38, respectively. As previously described, servo controller 598 is generally responsible for commanding seek and track follow operations via actuator assembly 540 and PMR head 20.

Is should be appreciated that embodiments of the invention may be implemented with servo controller and/or other circuitry, including microprocessor 584. Particularly, circuitry of the disk drive, including but not limited to servo controller 598 and/or microprocessor 584, may operate under the control of a program or routine to execute methods or processes in accordance with embodiments of the invention.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

In one embodiment, servo controller 598 may control seek operations with moveable PMR head 20. The servo controller 598 may operate in a first mode when seeking within one of the previously-described first or second servo patterns 36 or 38, respectively, and a second mode when seeking between the first and second servo patterns 36 and 38, respectively. Hereinafter servo pattern 36 will be referred to as the first servo pattern and servo pattern 38 will be referred to as the second servo pattern, however, it should be appreciated that this is merely for simplicity and, alternatively, servo pattern 38 could be the first servo pattern and servo pattern 36 could be the second servo pattern.

For example, in the first mode, servo controller 598 may control a seek operation between a start track of servo pattern 38 and an end track of the same servo pattern 38. In this example, the buffer zone 40 does not have to be taken into account because the servo controller 598 does not have to seek across the buffer zone 40. In this example, as will be described, the servo controller 598 does not have to utilize adjusted physical gray coded TKID values versus logical TKID values.

On the other hand, in the second mode, the servo controller 598 controls a seek operation between a start track of a servo pattern (e.g. second servo pattern 38) and an end track of another servo pattern (e.g. first servo pattern 36) and crosses and compensates for buffer zone 40 by utilizing adjusted physical gray code TKID values for the end track that accounts for the buffer zone size versus logical TKID values.

Figure 6:
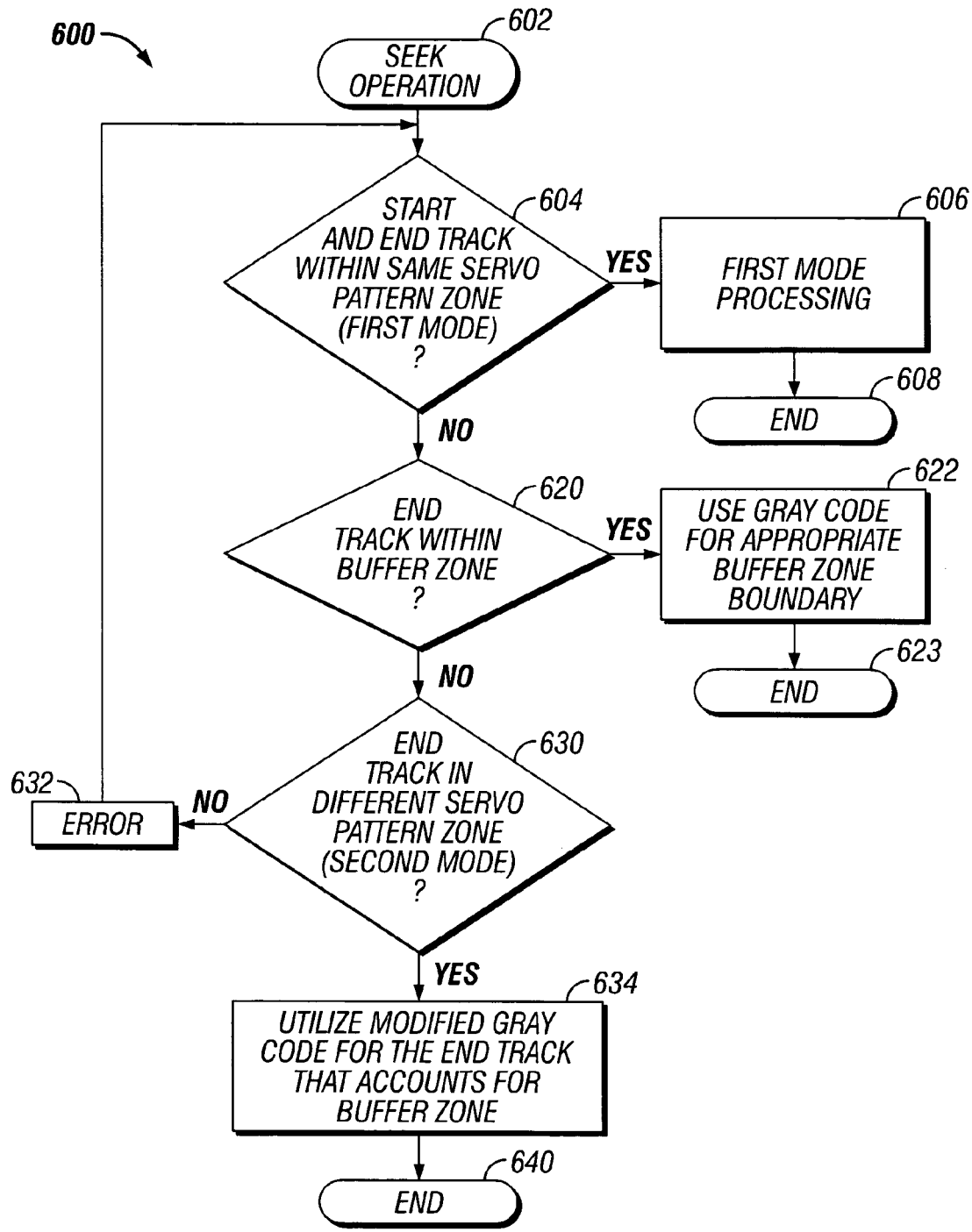
FIG. 6 is a flow diagram illustrating a process that the servo controller may utilize for seek operations utilizing a disk having a buffer zone, according to one embodiment of the present invention.

Turning now to FIG. 6, FIG. 6 is a flow diagram illustrating a process 600 that the servo controller may utilize for seek operations utilizing a disk 14 having a buffer zone 40.

Figure 7A:
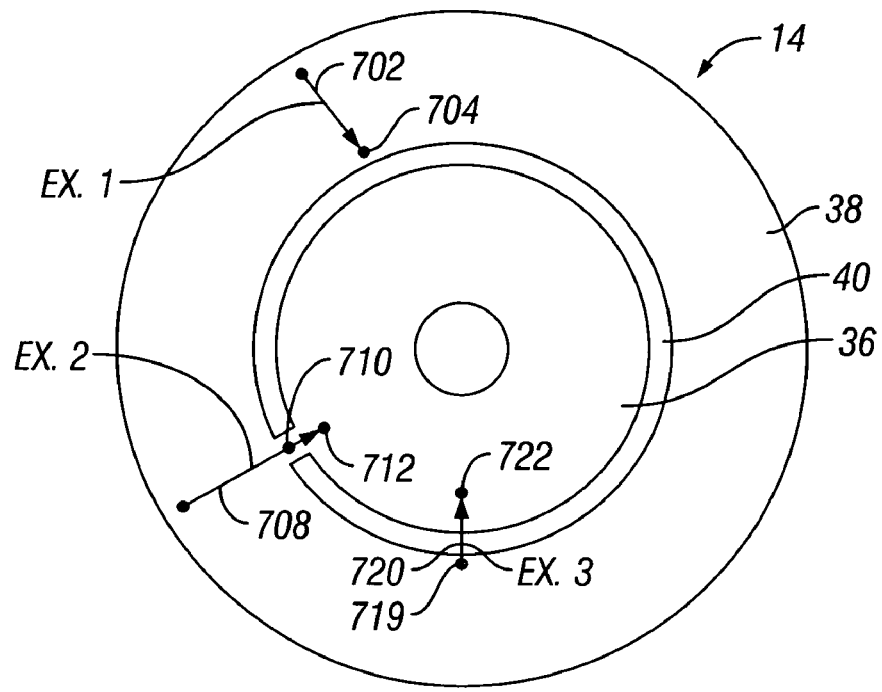
FIGS. 7A and 7B are diagrams illustrating examples of the process that the servo controller may utilize for seek operations utilizing a disk having a buffer zone, according to one embodiment of the present invention.
Figure 7B:
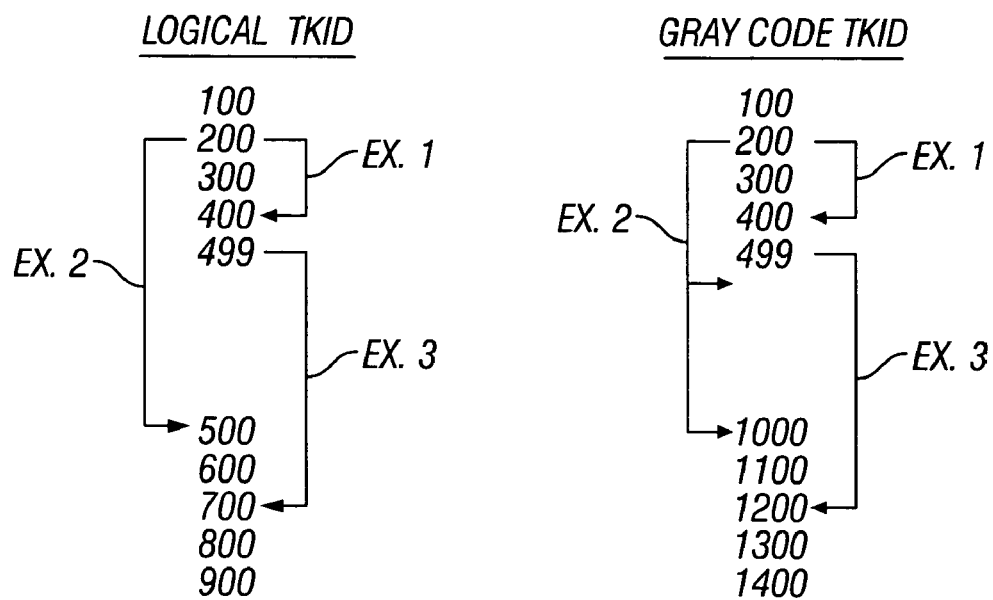

Also, simultaneous reference may also be made to FIGS. 7A and 7B, which illustrate a set of seeking examples (e.g. Example 1, Example 2, and Example 3) and associated commanded logical TKID values and actual physical gray code TKID values to implement the seek operations.

At block 602 the seek operation performed by the servo controller begins. At block 604 the servo controller first determines whether the start and end track are within the same servo pattern zone. This may be referred to as the first mode.

In the first mode, the seek operation is within a servo pattern zone defined by one of the first or second servo patterns (e.g. 36 or 38), previously discussed, and does not cross the buffer zone 40.

An example of this is illustrated in FIG. 7A as Example 1. If the seek operation 702 is within a single servo pattern zone (e.g. second servo pattern 38), then the servo controller initiates first mode processing (block 606). At block 608 the process ends.

Particularly, as seen in FIG. 7B, in Example 1, assuming as an example that the servo controller has been commanded to perform a seek operation from logical TKID 200 to logical TKID 400, the servo controller uses the unmodified gray code for the end track (i.e. physical gray code TKID 400) and commands the actuator to move the PMR head by two hundred tracks to physical gray coded track ID 400 within the same servo pattern zone.

Alternatively, if both the start and end track are in the other servo zone (e.g. first servo pattern 36; with start logical TKID=800 and end logical TKID=900) then first processing includes simply utilizing adjusted physical gray code values for both the start track and the end track (that already reflect the buffer zone) wherein start physical gray coded TKID=1300 and end physical gray coded TKID=1400. Thus, when the servo controller has been commanded to perform a seek operation from logical TKID 800 to logical TKID 900 (both in first servo pattern 36 on the other side of the buffer zone 40), during first processing, the servo controller uses the modified gray code for the end track (i.e. physical gray code TKID 1400) and commands the actuator to move the PMR head by one hundred tracks to physical gray coded TKID 1400 within the same servo pattern zone.

It should be appreciated that these are simple exemplary numbers for illustrative purposes.

However, if the end track to be seeked to is not within the same servo pattern zone, the servo controller next determines at decision block 620 whether the end track is within the buffer zone 40. If so, the servo controller adjusts the seek operation by utilizing an adjusted physical gray code TKID value for the appropriate buffer zone boundary (block 622). At block 623 the process ends.

An example of this is illustrated in FIGS. 7A and 7B, as Example 2. If the starting track (e.g. track 200) is within a servo pattern zone (e.g. second servo pattern 38), and the servo controller commands the actuator assembly to move the PMR head during a seek operation 708 from logical start TKID 200 to logical end TKID 500 (shown as point 710), which is within the buffer zone 40, the servo controller utilizes an adjusted or modified physical gray coded TKID value, for example 1000, shown as point 712, at the other end of the buffer zone 40 (i.e. it is an ID buffer zone boundary track). In this case, the servo controller moves the PMR head eight hundred tracks instead of three hundred tracks such that the approximately five hundred track buffer zone size is accounted for. In this way, the buffer zone is transparent to the rest of the disk drive and the host.

It should be appreciated that these are simple numbers for illustrative purposes only and the same or similar processes would work in opposite directions, as well. For example, in moving the head from servo pattern 36 to a commanded logical track that falls within buffer zone 40, the servo controller may utilize an OD buffer zone gray coded physical boundary TKID (e.g. 499).

Continuing on with process 600, if the end track is not within the buffer zone 40, then at decision block 630 it is determined whether the end track is in a different servo pattern zone than the start track such that the servo controller is in the second mode. If not, then an error has occurred and the servo controller seek operation restarts.

However, if the end track is in a different servo pattern zone than the start track, such that the servo controller is commanding the PMR head of the actuator assembly to move across buffer zone 40 then a modified or adjusted physical gray coded TKID for the end track that accounts for the buffer zone 40 is utilized by the servo controller.

For example, as shown in FIGS. 7A and 7B, with reference to Example 3, a seek operation from logical TKID 499 to logical TKID 700 is commanded. However, the servo controller utilizes a modified physical gray code to account for the buffer zone such that the servo controller commands a seek operation 720 in which the actuator assembly of the disk drive moves the PMR head from a starting logical TKID value 499 in servo pattern zone 38 (at point 719) (which is the same as the physical gray code TKID value) to actual physical gray code TKID value 1200 in servo pattern 36 (shown at point 722) to compensate for the five hundred track buffer zone, which is equivalent to the requested logical end track TKID value of 700. In other words, the servo controller adds the buffer zone size to the seek operation to account for the buffer zone 40. In this way, the buffer zone is transparent to the rest of the disk drive and host. The process then ends at block 640.

In this example, by utilizing the previously-described process, the servo controller by using buffer zone characteristics that include a buffer zone starting physical TKID gray code value of 500, a buffer zone ending physical TKID gray code value of 1000, and a buffer zone size of 500 tracks, the buffer zone that has been written to the disk during servo-writing is accounted for during seek operations by the servo-controller in a transparent fashion.

It should be appreciated that these are only exemplary numbers for illustrative purposes. Further, it should be apparent to those of skill in the art that the same or similar processes would work in opposite directions, as well. For example, if the servo controller was commanded to move the PMR head from a start track in servo pattern 36 to an end track in servo pattern 38, the buffer zone size would also be accounted for. Briefly, in this case, the servo controller would utilize a modified physical gray code at the start track to account for the buffer zone such that the servo controller would command a seek operation to move the PMR head from an actual physical TKID value in servo pattern zone 36 to a logical TKID value (that is the same as the actual physical gray code TKID value) in servo pattern 38 and during the seek operation would thereby compensate for the five hundred track buffer zone. In other words, the servo controller would still add the buffer zone size during the seek operation to compensate for the buffer zone 40, going in the opposite direction.

Thus, as described above, the servo controller may account for the buffer zone in a transparent fashion to the rest of the disk drive and host by using buffer zone characteristics such as, a buffer zone starting physical TKID gray code value, a buffer zone ending physical TKID gray code value, and a buffer zone size, to account for the buffer zone that was previously written to the disk during servo-writing during seek operations.

For example, these buffer zone characteristics may be stored in a table for use by the servo-controller during seek operations. The servo controller may utilize the buffer zone characteristics in mapping operations between logical TKIDs and actual physical gray coded TKIDs for seek operations, and in PID control, as well as in other forms of control. For example, in order to seek over the buffer zone the correct distance may be used (based on actual physical gray code values on the disk) rather than based on logical TKID values. In some operations, these values may be persistently fed to the servo control system for control purposes. These operations are performed by the servo controller in a transparent fashion to the rest of the disk drive and the host system.

As previously described, by servo writing a disk from the ID to the MD and then from the OD to the MD (or vice-versa) with a buffer zone therebetween, a disk can be formatted utilizing perpendicular media recording (PMR) technology (i.e. the head being a PMR head and writing with a perpendicular flux) in order to avoid unreadable servo sectors due to high skew angles, as previously described. By utilizing the previously-described servo methodology, the servo controller compensates for the buffer zone created in a seamless fashion such that it is hidden with respect to the rest of the disk drive system and the host. This may be implemented by simple servo controller code implementation without the need to change any of the other components of the disk drive system.

While embodiments of the present invention and its various functional components have been described in particular embodiments, it should be appreciated that the embodiments can be implemented in hardware, software, firmware, middleware, or a combination thereof and utilized in systems, subsystems, components, or sub-components thereof. When implemented in software, or firmware, the elements of the embodiments of the invention are the program/instruction/code segments to perform the necessary tasks.

The program, instruction, or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods described previously can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media.

We claim:

1. A disk drive comprising:
a moveable head operable with a perpendicular flux;
a disk having a plurality of tracks, each track having a plurality of servo sectors utilized in seek operations, wherein the servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively; and
a servo controller to control seek operations with the moveable head, the servo controller to operate in a first mode when seeking within one of the first or second servo patterns and a second mode when seeking between the first servo pattern and the second servo patterns.

2. The disk drive of claim 1, wherein a buffer zone is present between the first servo pattern and the second servo pattern proximate the MD of the disk.

3. The disk drive of claim 2, wherein the buffer zone includes an area that has been written to with both the first servo pattern and the second servo pattern.

4. The disk drive of claim 3, wherein buffer zone characteristics are determined upon power-up of the disk drive.

5. The disk drive of claim 4, wherein the buffer zone characteristics further include a buffer zone starting track identifier and a buffer zone ending track identifier.

6. The disk drive of claim 3, wherein the servo controller stores buffer zone characteristics including a buffer zone size.

7. The disk drive of claim 6, wherein, in the second mode, the servo controller controls a seek operation between a first track of the first servo pattern and a second track of the second servo pattern based upon an adjusted gray code value for the second track that accounts for the buffer zone size.

8. The disk drive of claim 2, wherein the buffer zone is less than approximately three-hundred tracks wide.

9. The disk drive of claim 1, wherein the head is approximately trapezoidally-shaped.

10. A method for performing seek operations in a disk drive comprising:
moving a head operable with a perpendicular flux relative to a disk, the disk having a plurality of tracks, each track having a plurality of servo sectors utilized in seek operations, wherein the servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively; and
controlling the movement of the head in both a first mode and a second mode to perform seek operations, wherein, in the first mode, the movement of the head for a seek operation is within one of the first or second servo patterns and, wherein, in the second mode, movement of the head for a seek operation is between the first servo pattern and the second servo pattern.

11. The method of claim 10, wherein a buffer zone is present between the first servo pattern and the second servo pattern proximate the MD of the disk.

12. The method of claim 11, wherein the buffer zone includes an area that has been written to with both the first servo pattern and the second servo pattern.

13. The method of claim 11, further comprising determining buffer zone characteristics upon power-up of the disk drive.

14. The method of claim 11, further comprising storing buffer zone characteristics including a buffer zone size.

15. The method of claim 14, wherein the buffer zone characteristics further include a buffer zone starting track identifier and a buffer zone ending track identifier.

16. The method of claim 14, wherein, in the second mode, further comprising controlling a seek operation between a first track and a second track based upon an adjusted gray code value for the second track that accounts for the buffer zone size.

17. The method of claim 11, wherein the buffer zone is less than approximately three-hundred tracks wide.

18. The method of claim 10, wherein the head is approximately trapezoidally-shaped.

19. In a disk drive including a head and processor-readable medium having stored thereon instructions, which when executed by a processor of the disk drive, causes the disk drive to perform operation comprising:
moving a head operable with a perpendicular flux relative to a disk, the disk having a plurality of tracks, each track having a plurality of servo sectors utilized in seek operations, wherein the servo sectors of the disk include a first servo pattern between one of an inner diameter (ID) or an outer diameter (OD) of the disk and a middle diameter (MD) of the disk, respectively, and a second servo pattern between the other of the OD or the ID of the disk and the MD of the disk, respectively; and
controlling the movement of the head in both a first mode and second mode to perform seek operations, wherein, in the first mode, the movement of the head for a seek operation is within one of the first or second servo patterns and, wherein, in the second mode, the movement of the head for a seek operation is between the first servo pattern and the second servo pattern.

20. The processor-readable medium of claim 19, wherein a buffer zone is present between the first servo pattern and the second servo pattern proximate the MD of the disk.

21. The processor-readable medium of claim 20, wherein the buffer zone includes an area that has been written to with both the first servo pattern and the second servo pattern.

22. The processor-readable medium of claim 20, further comprising instructions to determine buffer zone characteristics upon power-up of the disk drive.

23. The processor-readable medium of claim 20, further comprising instructions to store buffer zone characteristics including a buffer zone size.

24. The processor-readable medium of claim 23, wherein the buffer zone characteristics further include a buffer zone starting track identifier and a buffer zone ending track identifier.

25. The processor-readable medium of claim 23, wherein, in the second mode, further comprising instructions to control a seek operation between a first track of the first servo pattern and a second track of the second servo pattern based upon an adjusted gray code value for the second track that accounts for the buffer zone size.

26. The processor-readable medium of claim 20, wherein the buffer zone is less than approximately three-hundred tracks wide.

27. The processor-readable medium of claim 19, wherein the head is approximately trapezoidally-shaped.

* * * * *